US010972043B2

(12) United States Patent
Alan

(10) Patent No.: US 10,972,043 B2
(45) Date of Patent: Apr. 6, 2021

(54) SILVER LINING LIQUID-LAYER SOLAR ARRAY

(71) Applicant: Jordan Alan, Los Angeles, CA (US)

(72) Inventor: Jordan Alan, Los Angeles, CA (US)

( * ) Notice: Subject to any disclaimer, the term of this patent is extended or adjusted under 35 U.S.C. 154(b) by 259 days.

(21) Appl. No.: 15/980,693

(22) Filed: May 15, 2018

(65) Prior Publication Data

US 2019/0356264 A1 Nov. 21, 2019

(51) Int. Cl.
*H02S 20/23* (2014.01)
*H02S 40/42* (2014.01)
*H02S 40/44* (2014.01)
*H02S 40/22* (2014.01)
*H02S 40/30* (2014.01)

(52) U.S. Cl.
CPC .............. *H02S 20/23* (2014.12); *H02S 40/22* (2014.12); *H02S 40/30* (2014.12); *H02S 40/425* (2014.12); *H02S 40/44* (2014.12)

(58) Field of Classification Search
None
See application file for complete search history.

(56) References Cited

U.S. PATENT DOCUMENTS

| 4,180,057 A * | 12/1979 | Ward | F24S 70/60 126/675 |
| 4,345,586 A * | 8/1982 | Monjes | F24S 10/60 126/623 |
| 10,473,362 B2 * | 11/2019 | Armstrong | F24S 10/501 |
| 2010/0170092 A1 * | 7/2010 | Mills | F24S 25/20 29/890.033 |
| 2015/0194557 A1 * | 7/2015 | Williams | H02S 40/44 136/248 |

* cited by examiner

*Primary Examiner* — Sarah B McPartlin
(74) *Attorney, Agent, or Firm* — Kelsey Stout Intellectual Property

(57) ABSTRACT

A Silver Lining solar transfer module incorporates roof solar photovoltaic cells in a cased layer sandwiched between two water-handling layers. The bottom waste heat layer contains heat transfer pipes tuned for absorbing heat from the bottom of the photovoltaic layer and to dissipate heat into cool water pumped through the transfer pipes from ground level. The top cascade layer uses a casing transparent to solar radiation at the wavelengths used by the solar photovoltaic cells and containing a cascade of relatively cool water pumped from ground level, absorbing heat from the photovoltaic layer. The Silver Lining module is installed with a vertical slant, so that water is gravity fed from the top edge to the bottom edge in the waste heat layer and cascade layer. Fire sprinklers are incorporated into the plumbing of a system of Silver Lining solar transfer modules and provide protection to the roof in fire emergencies.

20 Claims, 9 Drawing Sheets

SILVER LINING LIQUID-LAYER SOLAR ARRAY

FIELD OF THE INVENTION

The invention relates to solar roof panels. More particularly, the present invention relates a roof system for managing solar power generation, hot water generation and fire suppression.

BACKGROUND INFORMATION

Roof solar photovoltaic power system operate in hot environments and generate heat. However, most common photovoltaic cells operate most efficiently when cool—overheating causes output current to rise but output voltage to drop, which must be compensated for at the DC-to-AC converter, resulting in more waste heat and inefficiency.

Some roof solar installations try to dissipate heat into air by leaving space between solar modules and roof tiles, but the air on a roof is often also hot and has little caloric absorption capacity. Water cooling offers greater cooling capacity, but necessitates the complication and expense of pumping water to a roof. A system is disclosed in this application which brings water cooling of roof solar installations to economic viability by making multiple synergistic uses of roof-pumped water in a roof photovoltaic system:

- Water-absorption of roof solar waste heat cools the solar cells and supplies residential hot water needs.
- Cascaded water layered above the photovoltaic cells filters out unused ultraviolet and infrared frequencies.
- Cascaded water layered above the photovoltaic cells also provides secondary water heating for swimming pools.
- Cascaded water layered above the photovoltaic cells tertiarily provides refraction of oblique light toward the photovoltaic cells below.
- Roof photovoltaic generates DC power.
- Smart water pumps monitor roof photovoltaic temperature, primary hot water requirements, secondary hot requirements, photovoltaic power requirements and roof water pumping costs to determine the optimum roof water pumping rate.
- Strategically placed fire sprinklers use roof pumped water to suppress residential emergency fires and regional forest fires spreading to residential roofs.

SUMMARY

A Silver Lining solar transfer module incorporates roof solar photovoltaic cells in a cased layer sandwiched between two water-handling layers. The bottom layer is a waste heat transfer layer containing heat transfer pipes tuned for absorbing heat from the bottom of the photovoltaic layer and to dissipate heat into relatively cool water pumped through the transfer pipes from ground level. The top layer is a cascade layer with a casing transparent to solar radiation at the wavelengths used by the solar photovoltaic cells and containing a cascade of relatively cool water pumped from ground level, absorbing heat from the top surface of the photovoltaic layer. The Silver Lining module is installed with a vertical slant, so that water is gravity fed from the top edge to the bottom edge in the waste heat layer and cascade layer.

Fire sprinklers are incorporated into the plumbing of a system of Silver Lining solar transfer modules and provide protection to the roof in fire emergencies.

Overview

The photovoltaic layer contains an array of solar cells, electrically connected in series. The flat casing has a lid, typically of tempered glass, transparent to visual light. An electrical input port and an electrical output port allow the Silver Lining module to be connected in series with other Silver Lining modules, with DC-to-AC converters, and with electrical storage.

The lid can be lifted for repairs and protects the solar cells. The photovoltaic layer casing itself can be lifted, via a hinge, to expose the waste heat layer beneath. The bottom of the photovoltaic layer casing in in contact with the waste heat layer, promoting transfer of waste heat from the photovoltaic layer to the waste heat layer.

Common photovoltaic cells operate most efficiently at a specific temperature—usually 25 degrees Celsius. Waste heat generated in a solar array can significantly reduce the useful output by raising the operating temperature and reducing the output voltage. The waste heat layer combats this temperature problem.

The waste heat layer contains a cold water inlet pipe along the high edge and a hot water return pipe along the low edge. There are cold water inflow and outflow connections and hot water inflow and outflow connections at the edge of the waste heat layer casing for sequential connections with other Silver Lining modules. A ground pump feeds relatively cool water from a municipal water source, a swimming pool, a water tank or other source to the roof and to the cold water inflow connections.

Waste heat transfer pipes allow water to flow from the cold water inlet pipe to the hot water outlet pipe by gravity. The piping in the waste heat layer has a coating or surface of matte black plastic to promote absorption of heat from the photovoltaic layer. Water in the waste heat transfer pipes absorbs the heat and returns to a swimming pool, hot water tank or residential hot water use, warmed by waste heat.

Typical visual light solar photovoltaic cells are made out of N-type and P-type semiconductor material that use visual light with wavelengths of 380 nm to 750 nm to generate electricity. The unused wavelengths (ultraviolet & infrared) do not have enough energy to dislodge the electrons and would normally be absorbed as heat, also contributing to the temperature efficiency problems of a solar array. The cascade layer combats this problem.

The cascade layer is a flat, watertight casing with a clear bottom surface and a clear lid that rests above the photovoltaic layer. The clear cascade lid and bottom allows visual light through to the photovoltaic cells beneath.

The cascade layer contains a perforated cold water inlet pipe along the high edge and a hot water gutter pipe along the low edge. There are cold water inflow and outflow connections and hot water inflow and outflow connections at the edge of the cascade layer casing for sequential connections with other Silver Lining modules. A ground pump feeds relatively cool water from a municipal water source, a swimming pool, a water tank or other source to the roof and to the cold water inflow connections.

The cold water inlet pipe has perforations allowing water to flow out by gravity and cascade down the clear bottom interior surface of the cascade layer pipe to the hot water gutter pipe by gravity. The piping in the cascade layer is, in the preferred embodiment, white or silvery.

Water in the water-tight cascade layer absorbs UV and IR radiation, preventing it from heating the photovoltaic layer. The cascading water also has the secondary function of refracting obliquely angled light further toward the photovoltaic layer, giving a marginal improvement in photovoltaic output at dawn and dusk.

Waste heat from the surface of the photovoltaic layer and from the absorbed UV and IR radiation heats the cascading water, which returns to a swimming pool, hot water tank or residential hot water use, again warmed by waste heat.

One or more Silver Lining modules is connected to water sources and water storage by cold water roof pipes and hot water return pipes. A computer-controlled water pump determines the temperature of the photovoltaic layers by detecting the output voltage of the system. By comparing the cost of producing electricity to meet the users electricity needs, the cost of producing hot water to meet the users hot water needs, the cost of cooling the Silver Lining modules with water, the optimum temperature of the photovoltaic cells and the efficiency loss from overheating of the photovoltaic cells, the computer-controlled water pump determines an optimum water-pumping rate to deliver water to the system of Silver Lining modules on the roof.

To make further use of system, fire sprinklers are installed at points along the cold water and hot water pipes. Fire sprinklers can be located on pipe corners or straight sections of pipe, or at pipe connections between two Silver Lining modules. Distances between fire sprinklers are determined to give maximum sprinkler coverage to the roof.

In many instances, a roof will have an irregular shape or a Silver Lining system will not cover an entire roof. In these cases, spray deflectors of selected fire sprinklers can be angled to spray water away from the Silver Lining installation toward other sections of roof.

In regions where forest fires are not expected, fire sprinklers can be of the thermal fuse or bulb type for quick response to house fires. In regions where forest fires are expected, remote controlled actuators can be installed at the fire sprinkler plugs to allow pre-emptive wetting of the roof in anticipation of approaching fires.

DETAILED DESCRIPTION

Figure 1:
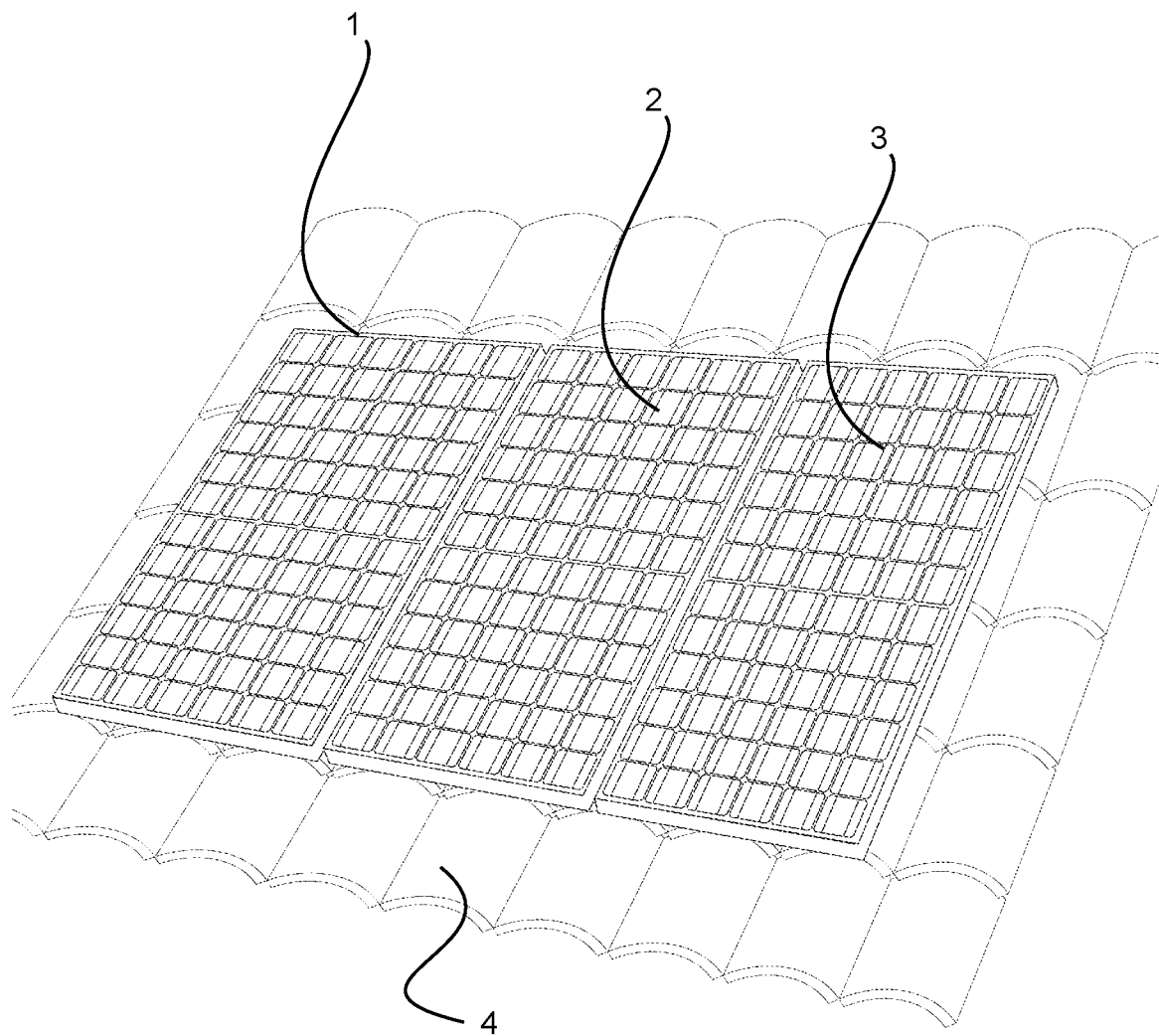
FIG. 1 (PRIOR ART) shows a typical array of roof photovoltaic (PV) solar modules in the prior art FIG. 2 (PRIOR ART) shows a typical array of roof solar-heated water panels in the prior art.

FIG. 1 (PRIOR ART) shows a typical array of roof photovoltaic (PV) solar modules in the prior art. A first module 1, a second module 2 and a third module 3 of photovoltaic tiles are show, installed over roof tiles 4. The modules are electrically interconnected in series to feed an inverter and either battery packs or water heaters.

Structural support members are usually a layer behind the PV tiles. Dust can accumulate on top of the PV tiles.

Figure 2:
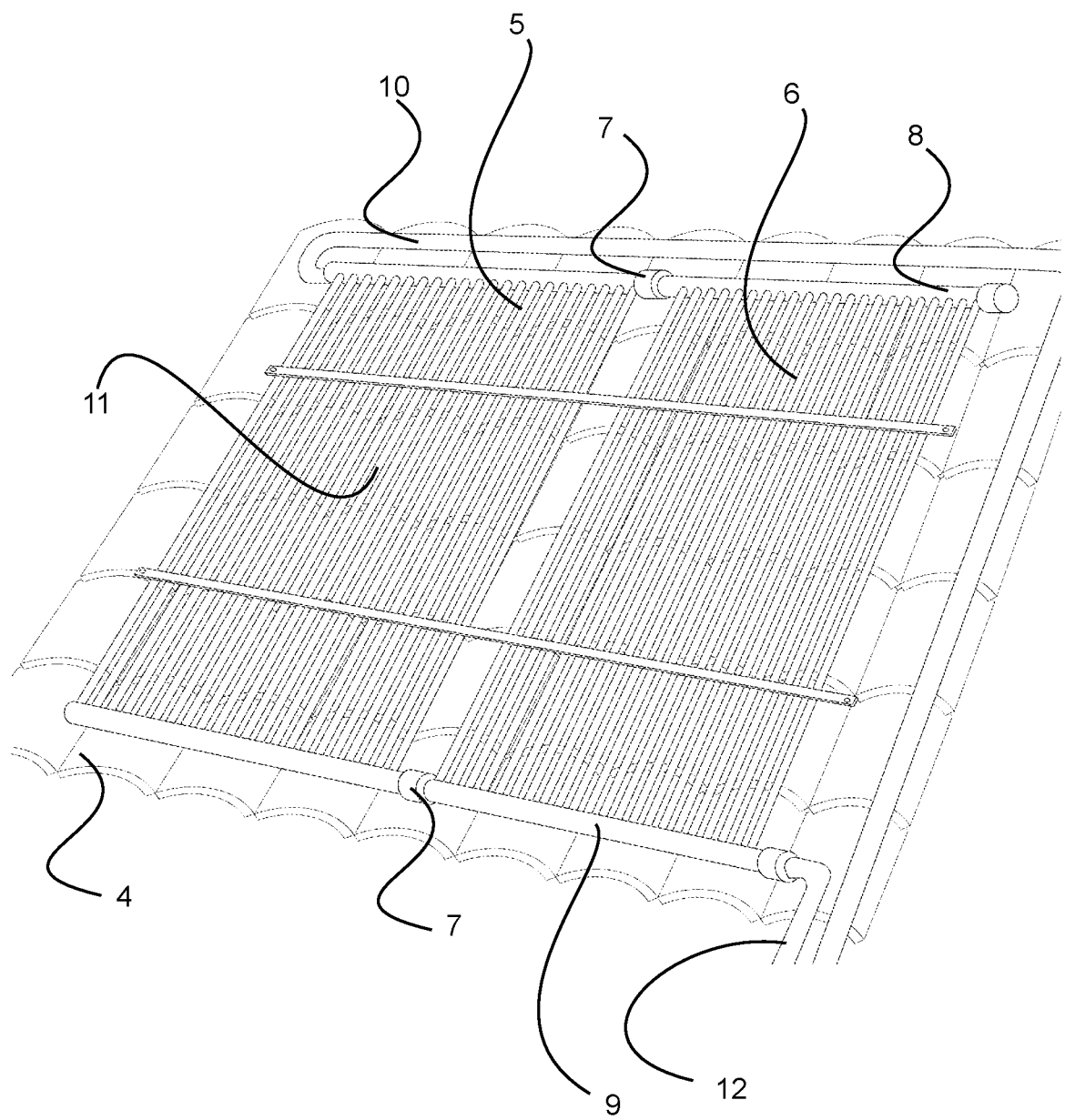

FIG. 2 (PRIOR ART) shows a typical array of roof solar-heated water panels in the prior art. A first solar-heated water panel 5 and second solar-heated water panel 6 installed over roof tiles 4 have pipe connections 7 at upper water distribution pipe sections 8 and lower water collection pipe sections 9. Directly circulated water is pumped to the roof via cold water pipe 10. Water heating pipes 11 are typically of matte black plastic for maximum heat absorption from light. The heated water is then recirculated to hot water storage by hot water return pipe 12 connected to the water collection pipe sections.

Figure 3:
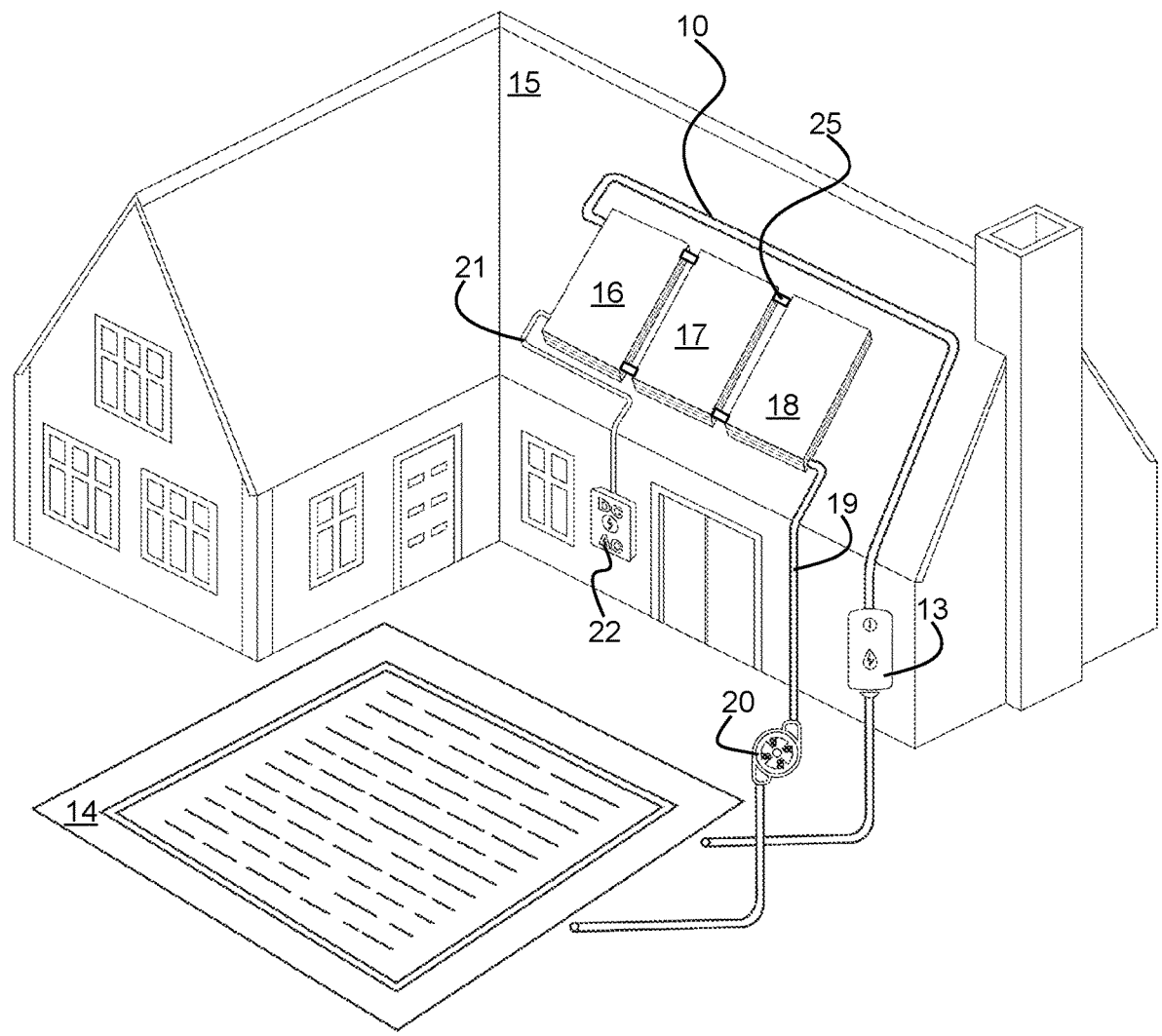
FIG. 3 is a view from above of the Silver Lining solar transfer system installed on a dwelling.

FIG. 3 is a view from above of the Silver Lining solar transfer system installed on a dwelling. A water pump 13 moves water from a water source, such as a municipal water line or a swimming pool 14 to the roof 15 of the dwelling via a cold water pipe 10. Cold water is delivered to a first Silver Lining module 16, and second Silver Lining module 17 and a third Silver Lining module 18 connected with pipe connections 25 in series. The water, having cascaded down the cascade layer of each Silver Lining Module, is returned via the cascade return pipes of each Silver Lining Module connected in series 19 back to water storage, such as the swimming pool 14 or a hot water tank 20.

Also connected in series are the DC electrical connections of each Silver Lining module, outputting photovoltaic DC power via a power line 21 to storage or a DC-to-AC converter 22.

Figure 4A:
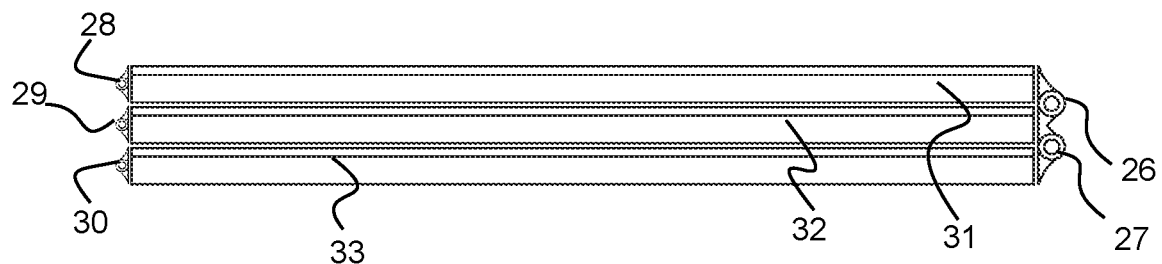
FIG. 4A illustrates a side view of a Silver Lining solar transfer module with three stacked layers closed by hinges.

FIG. 4A illustrates a side view of a Silver Lining solar transfer module with three stacked layers closed by hinges. The first main hinge 27 allows the photovoltaic layer 32 to be lifted, exposing the waste heat layer 33 below. The second main hinge 26 allows the cascade layer 31 to be lifted, exposing the photovoltaic layer 32 below.

The first and top 28 of three secondary hinges allows the clear lid of the cascade layer 31 to be lifted, exposing the interior of the cascade layer for cleaning or repair. The second and middle 29 of three secondary hinges allows the clear lid of the photovoltaic layer 32 to be lifted, exposing the interior of the photovoltaic layer for cleaning or repair. The third and bottom 30 of three secondary hinges allows the clear lid of the waste heat layer 33 to be lifted, exposing the interior of the cascade layer for cleaning or repair.

Figure 4B:
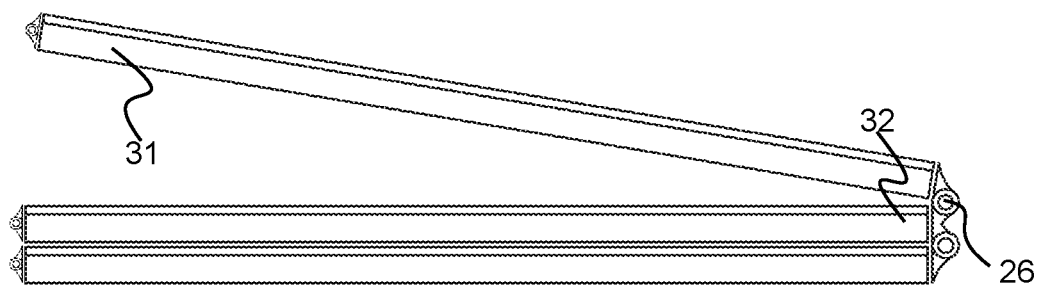
FIG. 4B illustrates a Silver Lining solar transfer module with the top cascade layer lifted to expose the middle photovoltaic layer beneath.

FIG. 4B illustrates a Silver Lining solar transfer module with the top cascade layer 31 lifted to expose the middle photovoltaic layer 32 beneath. The second main hinge 26 allows the cascade layer 31 to be lifted.

Figure 4C:
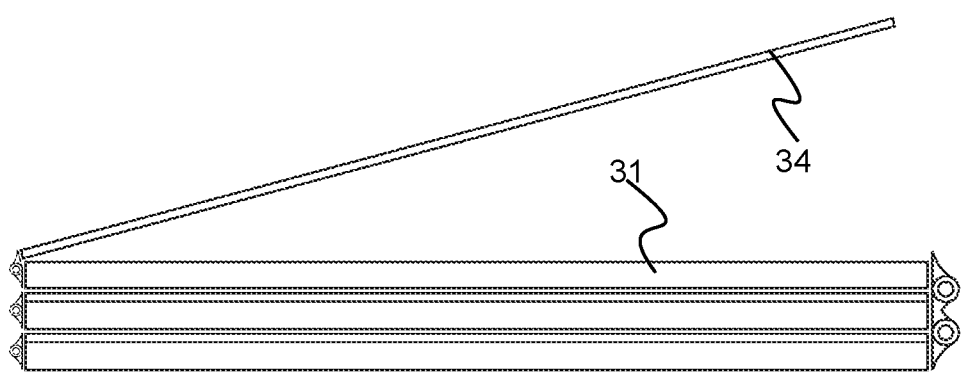
FIG. 4C illustrates a Silver Lining solar transfer module with the transparent lid of the top cascade layer lifted to exposed the inner workings of that layer.

FIG. 4C illustrates a Silver Lining solar transfer module with the transparent lid 34 of the top cascade layer 31 lifted to exposed the inner workings of that layer.

Similarly, the transparent lid 35 of the middle photovoltaic layer 32 can be lifted using the middle secondary hinge 29 after first lifting the cascade layer 31 out of the way. The transparent lid 36 of the lower waste heat layer 33 can be lifted using the lower secondary hinge 30 after first lifting the photovoltaic layer 32 out of the way.

Figures 5A, 5B:
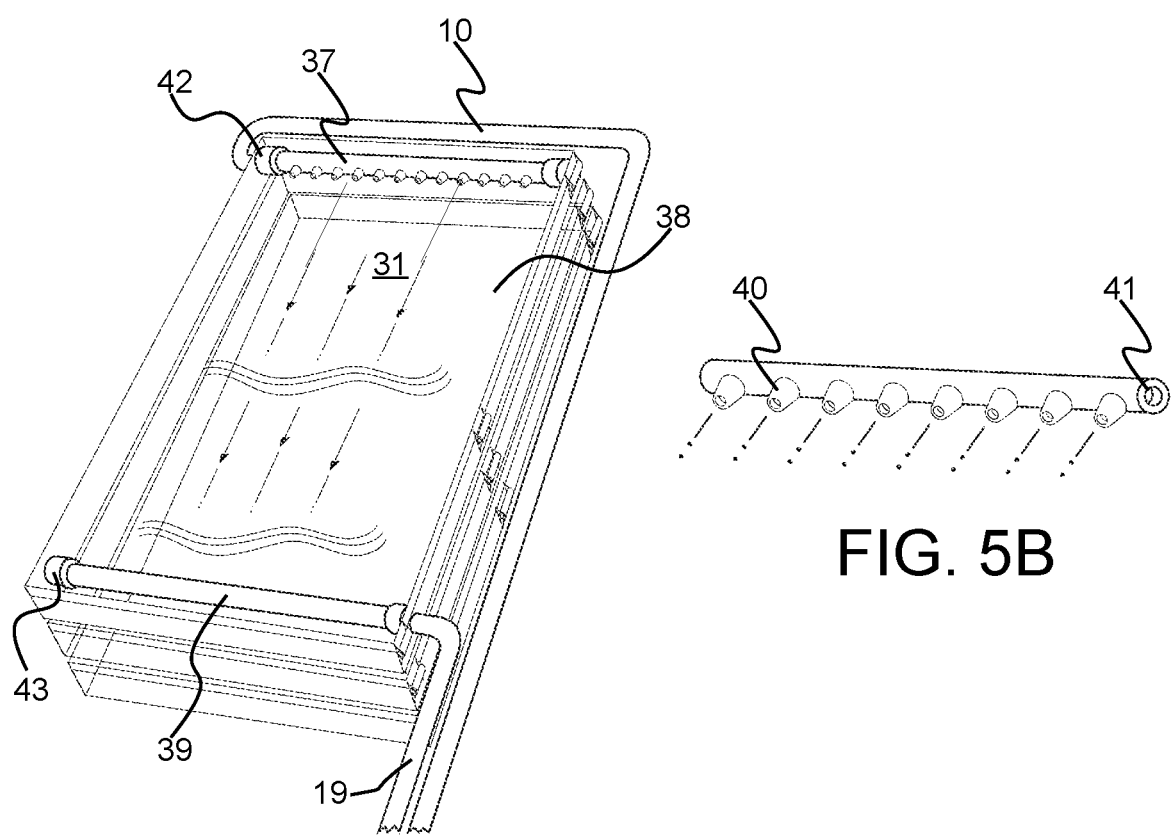
FIG. 5A is a top view of a Silver Lining solar transfer module with the working of the cascade layer illustrated.
FIG. 5B shows a magnified view of a portion of perforated pipe that releases water to the upper edge of the cascade layer of FIG. 5A

FIG. 5A is a top view of a Silver Lining solar transfer module with the working of the cascade layer 31 illustrated. A water inlet pipe 10 brings cold water in to the higher side of the layer and into a perforated distribution pipe 37 running across the high side of the interior of the cascade layer 31. The water pours out of the distribution pipe perforations to cascade down the transparent interior surface 38 of the cascade layer.

The distribution pipe perforations must be of sufficient size that the water pours out, rather than spraying or misting, to prevent excessive fogging of the transparent sandwich of the cascade layer. The cascading water cools the surface of the photovoltaic layer below and, in some light conditions, redirects angled light more directly toward the photovoltaic layer via refraction.

At the lower interior edge of the cascade layer, a gutter pipe 39 collects the cascaded water and sends it to a return pipe 19 or through the next gutter pipe in another Silver Lining module. The gutter pipe can have one or more water inlets.

FIG. 5B shows a magnified view of a portion of perforated pipe 37 that releases water to the upper edge of the cascade layer of FIG. 5A. In this embodiment, nozzles 40 direct water out of the pipe perforations. The pipe ends 41 will be matched to pipe connectors 42 or end caps 43 depending on the arrangement of the pipes.

Figure 6:
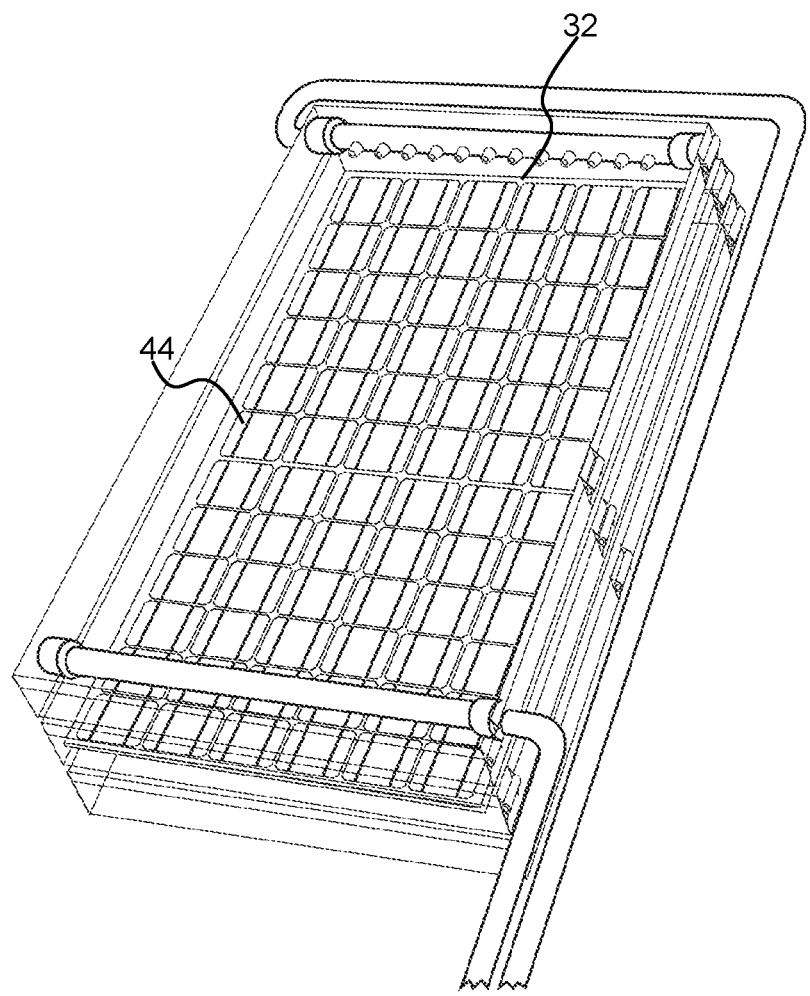
FIG. 6 shows the photovoltaic middle layer of a Silver Lining solar transfer module.

FIG. 6 shows the photovoltaic middle layer 32 of a Silver Lining solar transfer module. An array of solar cells 44 in the layer generate electricity directly from sunlight. The transparent casing of the cascade layer, above it, allows light through to the solar cells. The photovoltaic middle layer is cooled above and below by the cascade layer and the waste heat layer, respectively.

Figure 7:
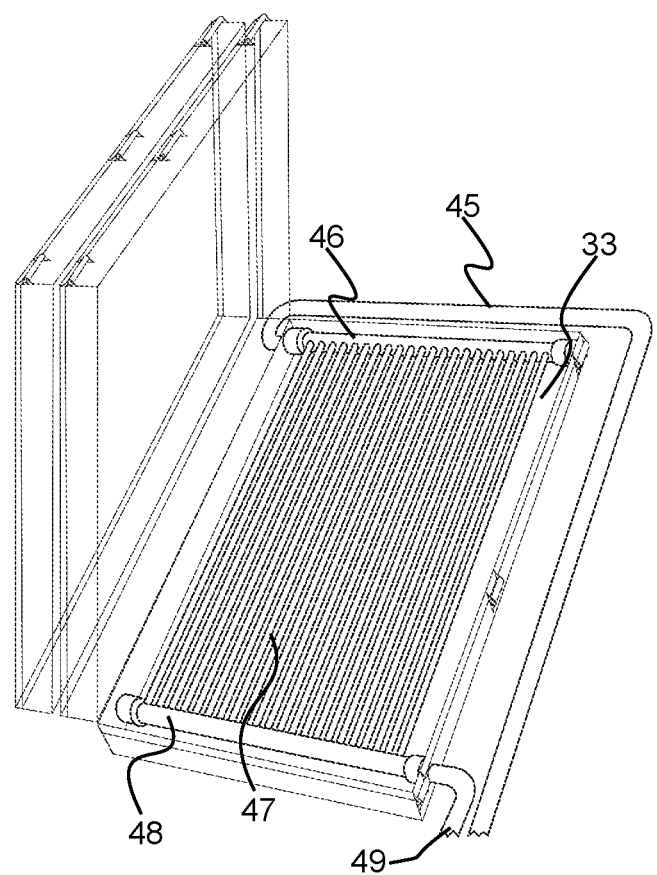
FIG. 7 shows the waste heat bottom layer of a Silver Lining solar transfer module, using straight pipes.

FIG. 7 shows the waste heat bottom layer 33 of a Silver Lining solar transfer module, using straight pipes. A water inlet pipe 45 brings cold water in to the higher side of the layer and into a perforated distribution pipe 46 running across the high side of the interior of the waste heat layer 33. The water pours out of the distribution pipe perforations to flow downward through heat transfer pipes 47. The heat transfer pipes and water inlet pipe are made of a dark or black, matte, heat resistant plastic in the preferred embodiment, in order to promote absorption of waste heat from the photovoltaic layer above. In another embodiment, the pipes are metal.

At the lower interior edge of the waste heat layer, a gutter pipe 48 collects the heated water and sends it to a return pipe 49 or through the next gutter pipe in another Silver Lining module. In this embodiment, the gutter pipe has an inlet for each heat transfer pipe. In the preferred embodiment, the water inlet pipe 45 of this layer is shared with and connects to the water inlet pipe of the cascade layer. And, in the preferred embodiment, the water return pipe 49 of this layer is shared with and connects to the water return pipe 14 of the cascade layer.

Figure 8:
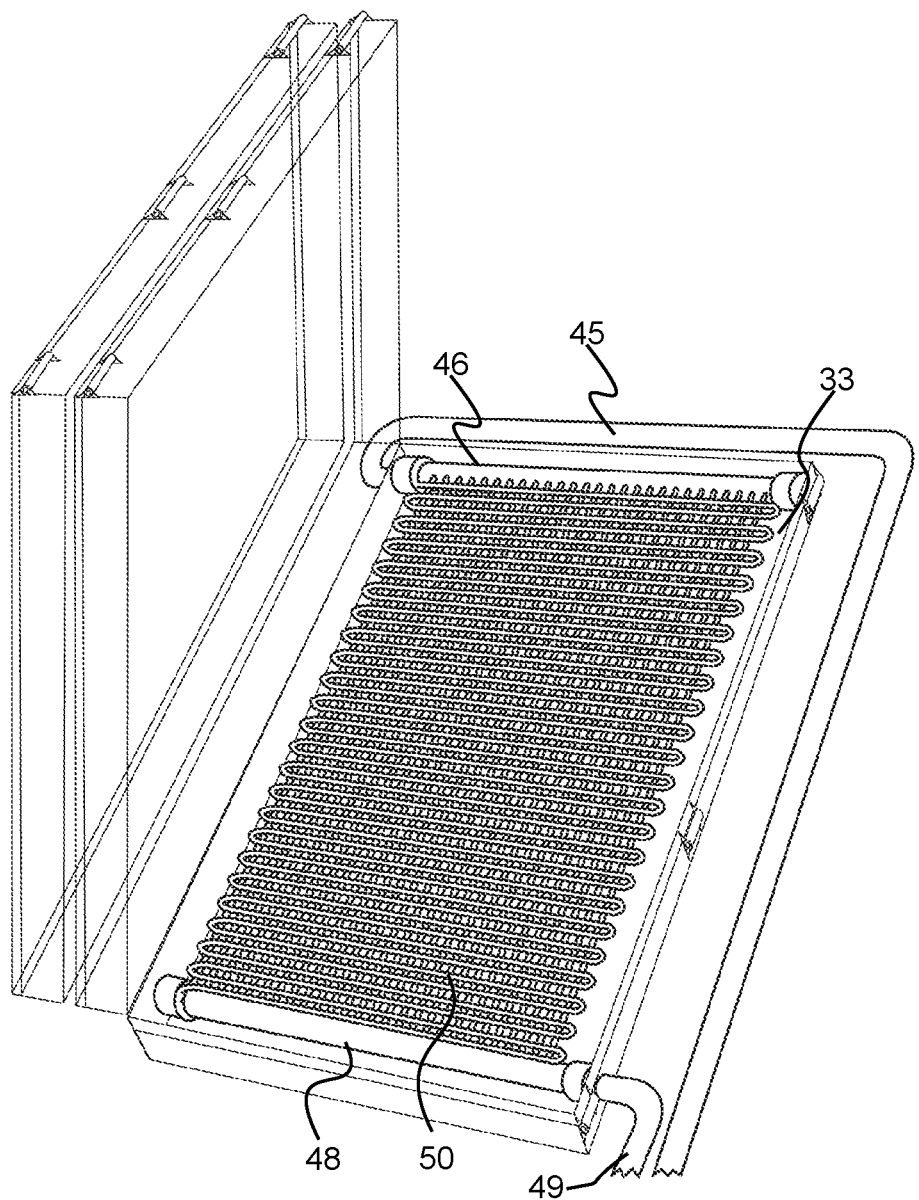
FIG. 8 shows the waste heat bottom layer of a Silver Lining solar transfer module in an embodiment using coiled pipes.

FIG. 8 shows the waste heat bottom layer 33 of a Silver Lining solar transfer module in an embodiment using coiled pipes. In this embodiment, one or more coiled pipes 50 are used to cause the water flowing through the pipes to remain longer in contact layer, absorbing heat from the photovoltaic layer above for longer per unit volume of water. Coiled pipes may be used in locations where the amount of waste heat from the photovoltaic layer is not expected to effectively saturate the faster moving transfer water in straight pipes.

A water inlet pipe 45 brings cold water in to the higher side of the layer and into a distribution pipe 46 running across the high side of the interior of the waste heat layer 33. At the lower interior edge of the waste heat layer, a gutter pipe 48 collects the heated water and sends it to a return pipe 49 or through the next gutter pipe in another Silver Lining module.

Figures 9A, 9B:
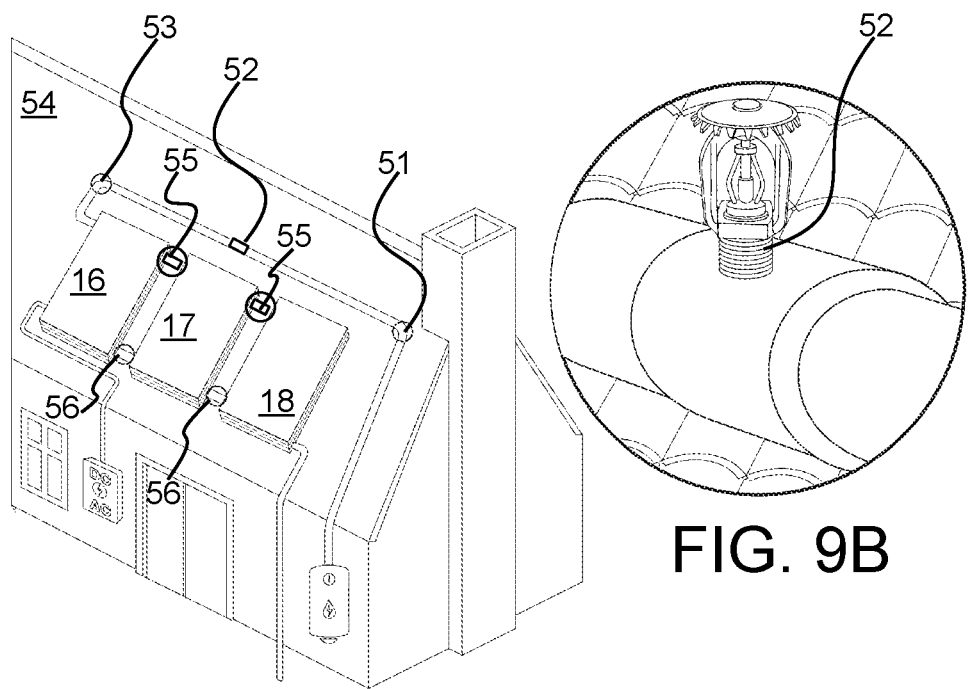
FIG. 9A illustrates locations of roof-oriented fire sprinklers in the Silver Lining solar transfer system installed on a dwelling.
FIG. 9B is a close-up of a roof-oriented fire sprinkler on a pipe sleeve of the Silver Lining solar transfer system.

FIG. 9A illustrates locations of roof-oriented fire sprinklers in the Silver Lining solar transfer system installed on a dwelling. These can be used to wet and protect the roof of the house from fires.

Fire sprinklers can be installed in corner connectors 51 of cold water inlet pipes 10 and along straight portions of the inlet pipe 52 as needed to give sprinkler coverage of the roof. Where a sprinkler 53 is placed closest to a large area of roof 54, it can be oriented to spray toward that area of roof, allowing the other sprinklers to cover the portions of roof holding the Silver Lining panels 16 17 and 18.

Fire sprinklers can also be installed in cold water connectors 55 and water outflow connectors 56 between the Silver Lining panels. They can also be used to wash dust from the surface of the panels.

FIG. 9B is a close-up of a roof-oriented fire sprinkler on a pipe sleeve of the Silver Lining solar transfer system. The illustrated fire sprinkler 52 is installed along a straight portion of the inlet pipe.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A system for management of solar energy collection, heat management and fire suppression of a roof, comprising:
    a first roof-mountable solar transfer module having a higher-tilted edge, a lower-tilted edge, a top surface, a bottom surface, a left edge and a right edge,
    said solar transfer module comprising a photovoltaic layer and a waste heat transfer layer,
    said photovoltaic layer being disposed on top of the waste heat transfer layer,
        said photovoltaic layer comprising a casing with a transparent lid and an array of photovoltaic cells,
        said waste heat transfer layer comprising a casing with a waste heat transfer layer casing lid and a waste heat transfer layer casing interior,
        said waste heat transfer layer casing interior having a higher-tilted edge and a lower-tilted edge,
        said waste heat transfer layer further comprising a water distribution pipe running across the higher-tilted edge of the waste heat transfer layer casing interior, a gutter pipe running across the lower-tilted edge of the waste heat transfer layer casing interior, and at least one heat transfer pipe connecting the water distribution pipe with the gutter pipe,
        the solar transfer module also comprising a cold water pipe connection port adjacent the waste heat transfer layer casing higher-tilted edge capable of allowing cold water pipe connections to the waste heat transfer layer water distribution pipe, a hot water pipe connection port adjacent the waste heat transfer layer casing lower-tilted edge capable of allowing hot water pipe connections to the waste heat transfer layer gutter pipe, and a photovoltaic power outlet port adjacent an edge of the photovoltaic layer casing.

2. The system of claim 1, wherein the at least one heat transfer pipe connecting the waste heat transfer layer water distribution pipe with the waste heat transfer layer gutter pipe is a coiled pipe.

3. The system of claim 1, wherein the at least one heat transfer pipe connecting the waste heat transfer layer water distribution pipe with the waste heat transfer layer gutter pipe is a black pipe.

4. The system of claim 1, wherein the at least one heat transfer pipe connecting the water distribution pipe with the gutter pipe has a matte surface.

5. The system of claim 1, wherein the at least one heat transfer pipe connecting the waste heat transfer layer water distribution pipe with the waste heat transfer layer gutter pipe is an array of straight pipes.

6. The system of claim 1, further comprising:
a cold water inlet pipe connectable with said cold water pipe connection port;
a hot water return pipe connectable with said hot water pipe connection port; and,
a DC power return cable connectable with said photovoltaic power outlet port.

7. The system of claim 1, wherein the solar transfer module further comprises
a waste heat transfer layer exit cold water pipe connection port opposite the waste heat transfer layer entrance cold water pipe connection port capable of allowing cold water pipe connections exiting the waste heat transfer layer water distribution pipe,
a waste heat transfer layer entrance hot water pipe connection port opposite the entrance hot water pipe connection port capable of allowing hot water pipe connections into the waste heat transfer layer gutter pipe, and
a photovoltaic power inlet port opposite the photovoltaic power outlet port,
the system also comprising:
a second solar transfer module,
wherein the waste heat transfer layer exit cold water pipe connection port of the first solar transfer module is functionally connected to the waste heat transfer layer entrance cold water pipe connection port of the second solar transfer module by an external cold water pipe connector, and
wherein the waste heat transfer layer exit hot water pipe connection port of the first solar transfer module is functionally connected to the waste heat transfer layer entrance hot water pipe connection port of the second solar transfer module by an external hot water pipe connector, and
wherein the photovoltaic power outlet port of the first solar transfer module is functionally connected to the photovoltaic power inlet port of the second solar transfer module.

8. The system of claim 1, also comprising a water pump.

9. The system of claim 1, also comprising a DC-to-AC converter.

10. The system of claim 9, wherein the fire sprinkler is disposed along a straight section of pipe.

11. The system of claim 9, further comprising:
a pipe corner, the fire sprinkler being disposed on the pipe corner.

12. The system of claim 9, further comprising:
a second solar transfer module;
a water pipe connector disposed between the first solar transfer module and the second solar transfer module, the fire sprinkler being disposed on the water pipe connector.

13. The system of claim 9, the system being disposed on a roof such that
a first portion of the roof is covered by a solar transfer module and
a second portion of roof at least equal in area to the first portion of roof is not covered by a solar transfer module;
the system further comprising a second fire sprinkler, the first fire sprinkler having a spray direction
oriented toward the first portion of roof and the second fire sprinkler having a spray direction oriented toward the second portion of roof.

14. The system of claim 1, wherein the solar transfer module further comprises a cascade layer,
said cascade layer being disposed on top of the photovoltaic layer,
the cascade layer comprising:
a cascade layer casing with a cascade layer lid transparent to at least some wavelengths of light, a cascade layer casing interior and a cascade surface transparent to at least some wavelengths of light,
the cascade layer casing having a higher-tilted edge, a lower-tilted edge, a top surface, a bottom surface, a left edge and a right edge,
the cascade layer casing interior having a higher-tilted edge and a lower-tilted edge,
a cascade layer water distribution pipe with water cascade perforations running across the higher-tilted edge of the cascade layer casing interior, said water cascade perforations being of sufficient size to allow water to pour through without vaporizing, and
a gutter pipe running across the lower-tilted edge of the cascade layer casing interior capable of collecting water from the cascade surface.

15. The system of claim 14, the solar transfer module also comprising:
a cascade layer entrance cold water pipe connection port, adjacent the cascade layer casing higher-tilted edge, capable of allowing cold water pipe connections into the cascade layer water distribution pipe, and
a cascade layer exit hot water pipe connection port adjacent the cascade layer casing lower-tilted edge capable of allowing hot water pipe connections to the waste heat transfer layer gutter pipe.

16. The system of claim 15, wherein the solar transfer module further comprises
a cascade layer exit cold water pipe connection port opposite the cascade layer entrance cold water pipe connection port capable of allowing cold water pipe connections exiting the cascade layer water distribution pipe,
a cascade layer entrance hot water pipe connection port opposite the cascade layer exit hot water pipe connection port capable of allowing hot water pipe connections into the waste heat transfer layer gutter pipe, and
a photovoltaic power inlet port opposite the photovoltaic power outlet port,
the system also comprising:
a second solar transfer module, wherein
the exit cold water pipe connection port of the first solar transfer module is functionally connected to the entrance cold water pipe connection port of the second solar transfer module by an external cold water pipe connector, and wherein the exit hot water pipe connection port of the first solar transfer module is functionally connected to the entrance hot water pipe connection port of the second solar transfer module by an external hot water pipe connector, and wherein the photovoltaic power outlet port of the first solar transfer module is functionally connected to the photovoltaic power inlet port of the second solar transfer module by a water-proof electrical connector.

17. The system of claim 1, further comprising:
a cold water inlet pipe;
a hot water outlet pipe;
and, a fire sprinkler.

18. A system for management of solar energy collection, heat management and fire suppression of a roof, comprising:
a fire sprinkler;
a first roof-mountable solar transfer module having a higher-tilted edge, a lower-tilted edge, a top surface, a bottom surface, a left edge and a right edge,
said solar transfer module comprising a cascade layer, a photovoltaic layer and a waste heat transfer layer,
said photovoltaic layer being disposed on top of the waste heat transfer layer,
said cascade layer being disposed on top of the photovoltaic layer,
said photovoltaic layer comprising
a casing with a transparent lid, and an array of photovoltaic cells,
said waste heat transfer layer comprising
a casing with a waste heat transfer layer casing lid and a waste heat transfer layer casing interior, said waste heat transfer layer casing interior having a higher-tilted edge and a lower-tilted edge,
a water distribution pipe running across the higher-tilted edge of the waste heat transfer layer casing interior,
a gutter pipe running across the lower-tilted edge of the waste heat transfer layer casing interior,
and at least one heat transfer pipe connecting the water distribution pipe with the gutter pipe,
said cascade layer comprising:
a cascade layer casing with a cascade layer lid transparent to at least some wavelengths of light, a cascade layer casing interior and a cascade surface transparent to at least some wavelengths of light,
the cascade layer having a higher-tilted edge, a lower-tilted edge, a top surface, a bottom surface, a left edge and a right edge,
the cascade layer casing interior having a higher-tilted edge and a lower-tilted edge,
a cascade layer water distribution pipe with water cascade perforations running across the higher-tilted edge of the cascade layer casing interior, said water cascade perforations being of sufficient size to allow water to pour through without vaporizing, and
a gutter pipe running across the lower-tilted edge of the cascade layer casing interior capable of collecting water from the cascade surface;
the solar transfer module also
comprising
a cold water pipe connection port adjacent the waste heat transfer layer casing higher-tilted edge capable of allowing cold water pipe connections into the waste heat transfer layer water distribution pipe,
a hot water pipe connection port adjacent the waste heat transfer layer casing lower-tilted edge capable of allowing hot water pipe connections to the waste heat transfer layer gutter pipe, and
a photovoltaic power outlet port adjacent an edge of the photovoltaic layer casing.

19. The system of claim 18,
said photovoltaic layer also comprising
a first main hinge useable to separate the photovoltaic layer from the waste heat transfer layer, and
a middle secondary hinge useable to lift the transparent lid of the photovoltaic layer;
said waste heat transfer layer also comprising
a bottom secondary hinge useable to lift the transparent lid of the waste heat transfer layer;
said cascade layer also comprising:
a second main hinge useable to separate the cascade layer from the photovoltaic layer; and,
and a top secondary hinge useable to lift the transparent lid of the cascade layer.

20. A method of managing electricity generation, hot water generation and fire suppression comprising the steps of:
pumping a first volume of water to a waste heat transfer layer of a first solar transfer module mounted on a roof;
receiving a first quantity of solar radiation into a photovoltaic layer of said first solar transfer module;
generating a DC current in said photovoltaic layer of said first solar transfer module;
conducting a DC current from said photovoltaic layer of said first solar transfer module;
generating a first quantity of waste heat in said photovoltaic layer of said first solar transfer module;
transferring waste heat from said first quantity of waste heat to said first volume of water;
returning said first volume of water from said waste transfer heat layer to a first water storage container;
pumping a second volume of water to a cascade layer of the first solar transfer module;
cascading the second volume of water through the cascade layer;
refracting a second quantity of solar radiation in said second volume of water;
generating a second quantity of waste heat in said photovoltaic layer of said first solar transfer module;
transferring waste heat from said second quantity of waste heat to said second volume of water;
and,
spraying a portion of said second volume of water onto said roof using a fire sprinkler.

* * * * *